United States Patent
Kouda et al.

(10) Patent No.: US 12,351,674 B2
(45) Date of Patent: Jul. 8, 2025

(54) POLYURETHANE RESIN COMPOSITION, REPELLENT, WATER REPELLENT FOR FIBERS, AND STAIN-PROOF COATING AGENT

(71) Applicants: MITSUI CHEMICALS, INC., Tokyo (JP); DAIKIN INDUSTRIES, LTD., Osaka (JP)

(72) Inventors: Chikako Kouda, Sodegaura (JP); Kazuyuki Fukuda, Ichihara (JP); Daisuke Noguchi, Osaka (JP); Keisuke Nakamura, Osaka (JP)

(73) Assignees: MITSUI CHEMICALS, INC., Tokyo (JP); DAIKIN INDUSTRIES, LTD., Osaka (JP)

( * ) Notice: Subject to any disclaimer, the term of this patent is extended or adjusted under 35 U.S.C. 154(b) by 608 days.

(21) Appl. No.: 17/788,145

(22) PCT Filed: Dec. 21, 2020

(86) PCT No.: PCT/JP2020/047711
§ 371 (c)(1),
(2) Date: Jun. 22, 2022

(87) PCT Pub. No.: WO2021/132170
PCT Pub. Date: Jul. 1, 2021

(65) Prior Publication Data
US 2023/0053165 A1   Feb. 16, 2023

(30) Foreign Application Priority Data
Dec. 24, 2019   (JP) .................................. 2019-233547

(51) Int. Cl.
| | | |
|---|---|---|
| C08G 18/12 | (2006.01) | |
| C08G 18/08 | (2006.01) | |
| C08G 18/09 | (2006.01) | |
| C08G 18/28 | (2006.01) | |
| C08G 18/32 | (2006.01) | |
| C08G 18/73 | (2006.01) | |
| C08G 18/79 | (2006.01) | |
| C08K 5/09 | (2006.01) | |
| C09K 3/18 | (2006.01) | |
| D06M 15/564 | (2006.01) | |

(52) U.S. Cl.
CPC ......... *C08G 18/12* (2013.01); *C08G 18/0814* (2013.01); *C08G 18/0866* (2013.01); *C08G 18/092* (2013.01); *C08G 18/2825* (2013.01); *C08G 18/3275* (2013.01); *C08G 18/73* (2013.01); *C08G 18/791* (2013.01); *C08K 5/09* (2013.01); *C09K 3/18* (2013.01); *D06M 15/564* (2013.01); C08G 2150/00 (2013.01)

(58) Field of Classification Search
None
See application file for complete search history.

(56) References Cited

U.S. PATENT DOCUMENTS

| | | |
|---|---|---|
| 2006/0155046 A1 | 7/2006 | Moors et al. |
| 2008/0194757 A1 | 8/2008 | Fujita et al. |
| 2008/0226829 A1 | 9/2008 | Choate |
| 2014/0295724 A1 | 10/2014 | Sworen et al. |
| 2015/0361300 A1 | 12/2015 | Sworen et al. |
| 2016/0090505 A1 | 3/2016 | Sworen et al. |
| 2019/0177908 A1 | 6/2019 | Coppens et al. |
| 2020/0017616 A1 | 1/2020 | Probst et al. |
| 2020/0239613 A1 | 7/2020 | Yamamoto et al. |
| 2022/0064851 A1 | 3/2022 | Tanaka et al. |

FOREIGN PATENT DOCUMENTS

| | | |
|---|---|---|
| CN | 109563339 A | 4/2019 |
| EP | 3460021 A1 | 3/2019 |
| JP | 2006328624 A | 12/2006 |
| JP | 2010521564 A | 6/2010 |
| JP | 2012136677 A | 7/2012 |
| JP | 2015120894 A | 7/2015 |
| JP | 2015120895 A | 7/2015 |
| JP | 2016524628 A | 8/2016 |
| JP | 2017-160354 A | 9/2017 |
| JP | 2017214664 A | 12/2017 |
| JP | 2017222827 A | 12/2017 |
| JP | 2017536439 A | 12/2017 |
| JP | 2019108641 A | 7/2019 |
| JP | 2019-173185 A | 10/2019 |
| JP | 2019533732 A | 11/2019 |
| JP | 2019534908 A | 12/2019 |
| WO | 2006038466 A1 | 4/2006 |
| WO | 2015111668 A1 | 7/2015 |
| WO | 2017199726 A1 | 11/2017 |
| WO | 2019026593 A1 | 2/2019 |
| WO | 2019240162 A1 | 12/2019 |
| WO | 2020/137902 A1 | 7/2020 |

OTHER PUBLICATIONS

Indian Examination Report dated Nov. 22, 2022 for Indian Patent Application No. 202217035590.

*Primary Examiner* — Randy P Gulakowski
*Assistant Examiner* — Virginia L Stonehocker
(74) *Attorney, Agent, or Firm* — RANKIN, HILL & CLARK LLP

(57) ABSTRACT

A polyurethane resin composition includes a reaction product of an aliphatic polyisocyanate derivative having an average number of isocyanate groups of 2 or more; a long-chain active hydrogen compound including a hydrocarbon group having 12 or more and 30 or less carbon atoms and an active hydrogen group in combination; a cationic active hydrogen compound including an active hydrogen group and a cationic group in combination; and an acid compound capable of a salt with the cationic group. The concentration of the hydrocarbon group is 30% or more and 85% or less.

7 Claims, No Drawings

POLYURETHANE RESIN COMPOSITION, REPELLENT, WATER REPELLENT FOR FIBERS, AND STAIN-PROOF COATING AGENT

TECHNICAL FIELD

The present invention relates to a polyurethane resin composition, a repellent, a water repellent for fibers, and a stain-proof coating agent, to be specific, to a polyurethane resin composition, a repellent containing the polyurethane resin composition, a water repellent for fibers containing the polyurethane resin composition, and a stain-proof coating agent containing the polyurethane resin composition.

BACKGROUND ART

Conventionally, a fluorine-based water repellent containing a fluorine compound has been known as a water repellent. When the water repellent is processed with respect to a substrate such as a fiber product, it exhibits excellent water repellency.

On the other hand, in recent years, in consideration of the influence on environmental load due to fluorine, there has been an increasing demand for a non-fluorine-based water repellent containing no fluorine compound.

As such a non-fluorine-based water repellent, for example, a compound which is a reaction product of a polyisocyanate compound and alkyl sorbitan has been proposed (ref: for example, Patent Document 1).

CITATION LIST

Patent Document

Patent Document 1: Japanese Unexamined Patent Application Publication No. 2016-524628

SUMMARY OF THE INVENTION

Problem to be Solved by the Invention

Recently, there has been a demand for improvement in water repellency for a non-fluorine-based water repellent.

In addition, the non-fluorine-based water repellent is also required for washing durability against fibers.

The present invention provides a polyurethane resin composition having excellent water repellency and washing durability against fibers, a repellent containing the polyurethane resin composition, a water repellent for fibers containing the polyurethane resin composition, and a stain-proof coating agent containing the polyurethane resin composition.

Means for Solving the Problem

The present invention [1] includes a polyurethane resin composition including a reaction product of an aliphatic polyisocyanate derivative having an average number of isocyanate groups of 2 or more; a long-chain active hydrogen compound including a hydrocarbon group having 12 or more and 30 or less carbon atoms and an active hydrogen group in combination; a cationic active hydrogen compound including a cationic group and an active hydrogen group in combination; and an acid compound capable of a salt with the cationic group, wherein the concentration of the hydrocarbon group is 30% or more and 85% or less.

The present invention [2] includes the polyurethane resin composition described in the above-described [1], wherein the aliphatic polyisocyanate derivative includes an isocyanurate derivative of an aliphatic polyisocyanate.

The present invention [3] includes the polyurethane resin composition described in the above-described [1] or [2], wherein in the cationic active hydrogen compound, the cationic group is a tertiary amino group, the active hydrogen group is a hydroxyl group, and the cationic active hydrogen compound has two or more hydroxyl groups per molecule.

The present invention [4] includes the polyurethane resin composition described in any one of the above-described [1] to [3], wherein the acid compound includes an organic acid.

The present invention [5] includes a repellent including the polyurethane resin composition described in any one of the above-described [1] to [4].

The present invention [6] includes a water repellent for fibers including the polyurethane resin composition described in any one of the above-described [1] to [4].

The present invention [7] includes a stain-proof coating agent including the polyurethane resin composition described in any one of the above-described [1] to [4].

Effect of the Invention

The polyurethane resin composition of the present invention includes a reaction product obtained using a long-chain active hydrogen compound, and the concentration of a hydrocarbon group is a predetermined ratio. Therefore, the polyurethane resin composition has excellent water repellency.

Further, the polyurethane resin composition includes a reaction product obtained using a cationic active hydrogen compound.

Therefore, the polyurethane resin composition has improved affinity for fibers, and as a result, has excellent washing durability against the fibers.

The repellent of the present invention includes the polyurethane resin composition of the present invention.

Therefore, the repellent has excellent water repellency, oil repellency, and oil resistance, and also has excellent washing durability against the fibers.

The water repellent for fibers of the present invention includes the polyurethane resin composition of the present invention.

Therefore, the water repellent for fibers has excellent water repellency, and also has excellent washing durability against the fibers.

The stain-proof coating agent of the present invention includes the polyurethane resin composition of the present invention.

Therefore, the stain-proof coating agent has excellent stain-proof properties.

DESCRIPTION OF EMBODIMENTS

A polyurethane resin composition of the present invention includes a reaction product of an aliphatic polyisocyanate derivative, a long-chain active hydrogen compound, a cationic active hydrogen compound, and an acid compound.

The aliphatic polyisocyanate derivative is a derivative of an aliphatic polyisocyanate.

Examples of the aliphatic polyisocyanate include aliphatic diisocyanates such as hexamethylene diisocyanate (hexane diisocyanate) (HDI), pentamethylene diisocyanate (pentane diisocyanate) (PDI), tetramethylene diisocyanate, trimethylene diisocyanate, 1,2-, 2,3-, or 1,3-butylene diisocyanate, and 2,4,4-, or 2,2,4-trimethylhexamethylene diisocyanate.

Further, the aliphatic polyisocyanate includes an alicyclic polyisocyanate.

Examples of the alicyclic polyisocyanate include alicyclic diisocyanates such as 3-isocyanatomethyl-3,5,5-trimethyl-cyclohexylisocyanate (isophorone diisocyanate, IPDI), 4,4'-, 2,4'-, or 2,2'-methylenebis(cyclohexylisocyanate) or a mixture thereof ($H_{12}$MDI), 1,3- or 1,4-bis(isocyanatomethyl)cyclohexane or a mixture thereof ($H_6$XDI), bis(isocyanatomethyl)norbornane (NBDI), 1,3-cyclopentenediisocyanate, 1,4-cyclohexanediisocyanate, 1,3-cyclohexanediisocyanate, methyl-2,4-cyclohexanediisocyanate, and methyl-2,6-cyclohexanediisocyanate.

As the aliphatic polyisocyanate, preferably, hexamethylene diisocyanate and 1,3-bis(isocyanatomethyl)cyclohexane (hereinafter, simply referred to as bis(isocyanatomethyl)cyclohexane) are used. More preferably, hexamethylene diisocyanate is used.

Examples of the aliphatic polyisocyanate derivative include multimers (for example, dimers, trimers (for example, isocyanurate derivative, iminooxadiazine dione derivative), pentamers, heptamers, etc.), allophanate derivatives (for example, allophanate derivative produced by a reaction of the above-described aliphatic polyisocyanate with a monohydric alcohol or a dihydric alcohol etc.), polyol derivatives (for example, polyol derivative produced by a reaction of the above-described aliphatic polyisocyanate with a trihydric alcohol (for example, trimethylolpropane etc.) (alcohol adduct, preferably trimethylolpropane adduct, etc.)), biuret derivatives (for example, biuret derivative produced by a reaction of the above-described aliphatic polyisocyanate with water or amines, etc.), urea derivatives (for example, urea derivative produced by a reaction of the above-described aliphatic polyisocyanate with diamine etc.), oxadiazinetrione derivatives (for example, oxadiazinetrione produced by a reaction of the above-described aliphatic polyisocyanate with carbon dioxide etc.), carbodiimide derivatives (carbodiimide derivative produced by a decarboxylation condensation reaction of the above-described aliphatic polyisocyanate etc.), uretdione derivatives, and uretonimine derivatives of the above-described aliphatic polyisocyanate.

As the aliphatic polyisocyanate derivative, preferably, an isocyanurate derivative, a trimethylolpropane adduct, an allophanate derivative, and a biuret derivative are used. More preferably, an isocyanurate derivative is used.

When the aliphatic polyisocyanate derivative includes the isocyanurate derivative, the texture becomes excellent.

Then, as the aliphatic polyisocyanate derivative, more preferably, an isocyanurate derivative of hexamethylene diisocyanate, a trimethylolpropane adduct of hexamethylene diisocyanate, an allophanate derivative of hexamethylene diisocyanate, a biuret derivative of hexamethylene diisocyanate, and an isocyanurate derivative of bis(isocyanatomethyl)cyclohexane are used. More preferably, an isocyanurate derivative of hexamethylene diisocyanate is used.

These aliphatic polyisocyanate derivatives may be used alone or in combination of two or more. Preferably, an isocyanurate derivative of hexamethylene diisocyanate is used alone, or an isocyanurate derivative of hexamethylene diisocyanate, and at least one kind selected from the group consisting of an isocyanurate derivative of bis(isocyanatomethyl)cyclohexane, a trimethylolpropane adduct of hexamethylene diisocyanate, an allophanate derivative of hexamethylene diisocyanate, and a biuret derivative of hexamethylene diisocyanate are used in combination.

In this case, a mixing ratio of the isocyanurate derivative of hexamethylene diisocyanate with respect to 100 parts by mass of the total amount of the isocyanurate derivative of hexamethylene diisocyanate, and at least one kind selected from the group consisting of the isocyanurate derivative of bis(isocyanatomethyl)cyclohexane, the trimethylolpropane adduct of hexamethylene diisocyanate, the allophanate derivative of hexamethylene diisocyanate, and the biuret derivative of hexamethylene diisocyanate is, for example, 60 parts by mass or more, preferably 70 parts by mass or more, and for example, 85 parts by mass or less. Also, the mixing ratio of at least one kind selected from the group consisting of the isocyanurate derivative of bis(isocyanatomethyl)cyclohexane, the trimethylolpropane adduct of hexamethylene diisocyanate, the allophanate derivative of hexamethylene diisocyanate, and the biuret derivative of hexamethylene diisocyanate is, for example, 15 parts by mass or more, and for example, 40 parts by mass or less, preferably 30 parts by mass or less.

Further, the aliphatic polyisocyanate derivative can be produced by a known method.

The aliphatic polyisocyanate derivative has an average number of isocyanate groups of 2 or more, preferably 2.5 or more, more preferably 2.9 or more, and for example, 3.8 or less.

When the above-described average number of isocyanate groups is the above-described lower limit or more, it is possible to improve the water repellency.

A method for measuring the average number of isocyanate groups is described in detail in Examples to be described later.

Further, when two or more kinds of aliphatic polyisocyanate derivatives are used in combination, the above-described average number of isocyanate groups is calculated by a weight ratio of the aliphatic polyisocyanate derivative, and the average number of isocyanate functional groups thereof.

The long-chain active hydrogen compound includes a hydrocarbon group having 12 or more and 30 or less carbon atoms, and an active hydrogen group reacting with the aliphatic polyisocyanate derivative in combination.

Examples of the hydrocarbon group having 12 or more and 30 or less carbon atoms include a straight-chain or branched-chain saturated hydrocarbon group having 12 or more and 30 or less carbon atoms (for example, an alkyl group etc.), and a straight-chain or branched-chain unsaturated hydrocarbon group having 12 or more and 30 or less carbon atoms (for example, an alkenyl group etc.).

An example of the active hydrogen group includes a hydroxyl group.

Examples of the long-chain active hydrogen compound including a hydrocarbon group and an active hydrogen group in combination include a straight-chain saturated hydrocarbon group-containing active hydrogen compound, a branched-chain saturated hydrocarbon group-containing active hydrogen compound, a straight-chain unsaturated hydrocarbon group-containing active hydrogen compound, and a branched-chain unsaturated hydrocarbon group-containing active hydrogen compound.

The straight-chain saturated hydrocarbon group-containing active hydrogen compound is an active hydrogen compound including a straight-chain saturated hydrocarbon group having 12 or more and 30 or less carbon atoms, and examples thereof include straight-chain saturated hydrocarbon group-containing alcohols such as n-tridecanol, n-tetradecanol, n-pentadecanol, n-hexadecanol, n-heptadecanol, n-octadecanol (stearyl alcohol), n-nonadecanol, and eicosanol, and straight-chain saturated hydrocarbon group-containing sorbitan esters such as sorbitan tristearate.

The branched-chain saturated hydrocarbon group-containing active hydrogen compound is an active hydrogen compound including a branched-chain saturated hydrocarbon group having 12 or more and 30 or less carbon atoms, and examples thereof include branched-chain saturated hydrocarbon group-containing alcohols such as isomyristyl alcohol, isocetyl alcohol, isostearyl alcohol, and isoeicosyl alcohol.

The straight-chain unsaturated hydrocarbon group-containing active hydrogen compound is an active hydrogen compound including a straight-chain unsaturated hydrocarbon group having 12 or more and 30 or less carbon atoms, and examples thereof include straight-chain unsaturated hydrocarbon group-containing alcohols such as tetradecenyl alcohol, hexadecenyl alcohol, oleyl alcohol, icosenyl alcohol, docosenyl alcohol, tetracosenyl alcohol, hexacosenyl alcohol, and octacosenyl alcohol.

The branched-chain unsaturated hydrocarbon group-containing active hydrogen compound is an active hydrogen compound including a branched-chain unsaturated hydrocarbon group having 12 or more and 30 or less carbon atoms, and an example thereof includes phytol.

As the long-chain active hydrogen compound, preferably, a straight-chain saturated hydrocarbon group-containing active hydrogen compound and a straight-chain unsaturated hydrocarbon group-containing active hydrogen compound are used.

These long-chain active hydrogen compounds may be used alone or in combination of two or more.

When the long-chain active hydrogen compound is used alone, preferably, a straight-chain saturated hydrocarbon group-containing active hydrogen compound is used alone. More preferably, a straight-chain saturated hydrocarbon group-containing alcohol is used alone. Even more preferably, a stearyl alcohol is used alone.

When two or more kinds of long-chain active hydrogen compounds are used in combination, preferably, a straight-chain saturated hydrocarbon group-containing active hydrogen compound and a straight-chain unsaturated hydrocarbon group-containing active hydrogen compound are used in combination. More preferably, a straight-chain saturated hydrocarbon group-containing alcohol and a straight-chain unsaturated hydrocarbon group-containing alcohol are used in combination, and a straight-chain saturated hydrocarbon group-containing alcohol, a straight-chain saturated hydrocarbon group-containing sorbitan ester, and a straight-chain unsaturated hydrocarbon group-containing alcohol are used in combination.

When the straight-chain saturated hydrocarbon group-containing alcohol and the straight-chain unsaturated hydrocarbon group-containing alcohol are used in combination, the mixing ratio of the straight-chain saturated hydrocarbon group-containing alcohol with respect to 100 parts by mass of the total amount of the straight-chain saturated hydrocarbon group-containing alcohol and the straight-chain unsaturated hydrocarbon group-containing alcohol is, for example, 40 parts by mass or more, preferably 55 parts by mass or more, more preferably 70 parts by mass or more. Further, the mixing ratio of the straight-chain unsaturated hydrocarbon group-containing alcohol with respect to 100 parts by mass of the total amount of the straight-chain saturated hydrocarbon group-containing alcohol and the straight-chain unsaturated hydrocarbon group-containing alcohol is, for example, 60 parts by mass or less, preferably 45 parts by mass or less, more preferably 30 parts by mass or less.

When the mixing ratio of the straight-chain saturated hydrocarbon group-containing alcohol is the above-described lower limit or more, the crystallinity of the hydrocarbon group is improved, and as a result, the water repellency can be improved.

When the straight-chain saturated hydrocarbon group-containing alcohol, the straight-chain saturated hydrocarbon group-containing sorbitan ester, and the straight-chain unsaturated hydrocarbon group-containing alcohol are used in combination, the mixing ratio of the straight-chain saturated hydrocarbon group-containing alcohol with respect to 100 parts by mass of the total amount of the straight-chain saturated hydrocarbon group-containing alcohol, the straight-chain saturated hydrocarbon group-containing sorbitan ester, and the straight-chain unsaturated hydrocarbon group-containing alcohol is, for example, 30 parts by mass or more, and for example, 60 parts by mass or less. Further, the mixing ratio of the straight-chain saturated hydrocarbon group-containing sorbitan ester with respect to 100 parts by mass of the total amount of the straight-chain saturated hydrocarbon group-containing alcohol, the straight-chain saturated hydrocarbon group-containing sorbitan ester, and the straight-chain unsaturated hydrocarbon group-containing alcohol is, for example, 20 parts by mass or more, and for example, 50 parts by mass or less. Further, the mixing ratio of the straight-chain unsaturated hydrocarbon group-containing alcohol with respect to 100 parts by mass of the total amount of the straight-chain saturated hydrocarbon group-containing alcohol, the straight-chain saturated hydrocarbon group-containing sorbitan ester, and the straight-chain unsaturated hydrocarbon group-containing alcohol is, for example, 10 parts by mass or more, and for example, 20 parts by mass or less.

When two or more kinds of long-chain active hydrogen compounds are used in combination, even more preferably, a straight-chain saturated hydrocarbon group-containing alcohol and a straight-chain unsaturated hydrocarbon group-containing alcohol are used in combination. Particularly preferably, a stearyl alcohol and an oleyl alcohol are used in combination.

The cationic active hydrogen compound includes an active hydrogen group and a cationic group in combination.

The active hydrogen group is, as described above, an active hydrogen group which reacts with the aliphatic polyisocyanate derivative, and an example thereof includes a hydroxyl group.

Further, the cationic active hydrogen compound preferably has two or more hydroxyl groups per molecule.

An example of the cationic group includes a tertiary amino group.

In other words, the cationic active hydrogen compound preferably includes two or more hydroxyl groups per molecule, as an active hydrogen group, and a tertiary amino group, as a cationic group, in combination.

According to such a cationic active hydrogen compound, excellent dispersibility of the polyurethane resin composition to water can be imparted, and also, a cationic group having affinity for fibers (described later) can be introduced into the resin, so that the washing durability can be improved.

More preferably, the cationic active hydrogen compound includes two hydroxyl groups per molecule, as an active hydrogen group, and a tertiary amino group, as a cationic group, in combination.

Examples of such a cationic active hydrogen compound include alkyldialkanolamines such as N-methyldiethanolamine, N-ethyldiethanolamine, N-propyldiethanolamine, N-butyldiethanolamine, and N-methyldipropanolamine, and preferably, N-methyldiethanolamine is used.

These cationic active hydrogen compounds may be used alone or in combination of two or more.

The acid compound is a compound capable of a salt with the cationic group.

Examples of the acid compound include an organic acid and an inorganic acid.

Examples of the organic acid include acetic acid, lactic acid, tartaric acid, and malic acid, and preferably, acetic acid and lactic acid are used. More preferably, acetic acid is used.

Examples of the inorganic acid include hydrochloric acid, sulfuric acid, and phosphorus acid, and preferably, hydrochloric acid is used.

As the acid compound, preferably, organic acid is used.

When the acid compound includes the organic acid, from the viewpoint of lowering the ionic properties and improving the water resistance due to volatilization of the acid by heat treatment, the water repellency can be improved. Further, since the acid is volatilized by the heat treatment, it is possible to improve the washing durability against the fibers (described later) from the viewpoint that the cationic group is easily adsorbed on the fibers.

These acid compounds may be used alone or in combination of two or more.

Then, in order to obtain the polyurethane resin composition, the aliphatic polyisocyanate derivative, the long-chain active hydrogen compound, the cationic active hydrogen compound, and the acid compound are reacted.

In order to react the aliphatic polyisocyanate derivative, the long-chain active hydrogen compound, the cationic active hydrogen compound, and the acid compound, first, the long-chain active hydrogen compound is blended into the aliphatic polyisocyanate derivative, and the aliphatic polyisocyanate derivative and the long-chain active hydrogen compound are reacted.

At this time, the long-chain active hydrogen compound is blended so that, for example, when the average number of isocyanate groups of the isocyanurate derivative of the aliphatic polyisocyanate is 3, preferably, among the isocyanurate derivatives of the aliphatic polyisocyanate, the two isocyanate groups are modified to a hydrocarbon group having 12 or more and 30 or less carbon atoms by the long-chain active hydrogen compound, and among the isocyanurate derivatives of the aliphatic polyisocyanate, the one isocyanate group remains and the isocyanurate derivative of the unreacted aliphatic polyisocyanate does not remain.

Specifically, the long-chain active hydrogen compound is blended into the aliphatic polyisocyanate derivative so that an equivalent ratio (isocyanate group/active hydrogen group) of the isocyanate group to the active hydrogen group is, for example, 1.2 or more, preferably 1.5 or more, and for example, 2.0 or less.

Thus, a molecule terminal of the reaction product (hereinafter, referred to as a first intermediate reaction product) of the aliphatic polyisocyanate derivative and the long-chain active hydrogen compound becomes a hydrocarbon group having 12 or more and 30 or less carbon atoms and an isocyanate group.

Further, the above-described reaction is carried out under a nitrogen atmosphere. In addition, the reaction conditions include a reaction temperature of, for example, 70° C. or more and 120° C. or less, and the reaction time of 1 hour or more and 6 hours or less.

In addition, the above-described reaction is carried out until the isocyanate concentration of the first intermediate reaction product reaches a predetermined calculated value.

The isocyanate concentration can be measured by an n-dibutylamine method in conformity with JIS K-1556 using a potentiometric titrator.

In addition, in the above-described reaction, a known solvent such as methyl ethyl ketone may be also blended at an appropriate ratio.

Then, the cationic active hydrogen compound is blended into a reaction liquid including the first intermediate reaction product, and the first intermediate reaction product and the cationic active hydrogen compound are reacted.

At this time, the cationic active hydrogen compound is blended into the first intermediate reaction product so that the equivalent ratio (isocyanate group/active hydrogen group) of the isocyanate group to the active hydrogen group of the cationic active hydrogen compound is, for example, 0.95 or more, and for example, 1.05 or less.

Further, the above-described reaction is carried out under a nitrogen atmosphere. In addition, the reaction conditions include a reaction temperature of, for example, 70° C. or more and 120° C. or less, and the reaction time of 0.5 hours or more and 4 hours or less.

Further, the above-described reaction is carried out until the reaction of the first intermediate reaction product and the cationic active hydrogen compound is completed.

In addition, in the above-described reaction, a known solvent such as methyl ethyl ketone may be blended at an appropriate ratio.

In this manner, a reaction product (hereinafter, referred to as a second intermediate reaction product) of the first intermediate reaction product and the cationic active hydrogen compound is obtained.

The second intermediate reaction product has a hydrocarbon group having 12 or more and 30 or less carbon atoms, and a cationic group.

Next, an acid compound is blended into the second intermediate reaction product.

The mixing ratio of the acid compound with respect to 1 mol of the cationic group of the cationic active hydrogen compound is, for example, 0.5 mol or more, preferably 3 mol or more, and for example, 10 mol or less, preferably 4 mol or less.

In this manner, the acid compound forms the cationic group and salt of the second intermediate reaction product, and a reaction liquid including the reaction product of the aliphatic polyisocyanate derivative, the long-chain active hydrogen compound, the cationic active hydrogen compound, and the acid compound is obtained.

The above-described reaction product has a hydrocarbon group having 12 or more and 30 or less carbon atoms, and has a cationic group.

Further, since the above-described reaction product has the hydrocarbon group having 12 or more and 30 or less carbon atoms, it can be self-dispersed (self-emulsified) in water regardless of a dispersant (emulsifier). In other words, the above-described reaction product can be internally emulsified.

Next, water is added to the reaction liquid and emulsified, while the temperature of the reaction liquid is kept at, for example, 50° C. or more and 100° C. or less.

Thereafter, the solvent is removed from the reaction liquid.

In this manner, an aqueous dispersion liquid (aqueous dispersion liquid of the polyurethane resin composition) including the above-described reaction product is obtained.

The solid content concentration of the aqueous dispersion liquid is, for example, 10% by mass or more, and for example, 30% by mass or less.

Since such a polyurethane resin composition includes the reaction product obtained using the long-chain active hydrogen compound, it has excellent oil repellency, oil resistance, and stain-proof properties, while having excellent water repellency.

Further, since the polyurethane resin composition includes the reaction product obtained using the cationic active hydrogen compound, the affinity for the fibers (described later) is improved, and as a result, the washing durability against the fibers (described later) is excellent.

In addition, in such a polyurethane resin composition, the concentration of the hydrocarbon group is 30% or more, and 85% or less, preferably 50%.

When the concentration of the hydrocarbon group is the above-described lower limit or more, the water repellency can be improved.

On the other hand, when the concentration of the hydrocarbon group is below the above-described lower limit, the water repellency decreases.

Further, when the concentration of the hydrocarbon group is the above-described upper limit or less, the stability of the polyurethane resin can be improved.

On the other hand, when the concentration of the hydrocarbon group is above the above-described upper limit, the stability of the polyurethane resin decreases.

The concentration of the above-described hydrocarbon group can be calculated from a charging amount of each component described above.

In the above-described description, first, the aliphatic polyisocyanate derivative and the long-chain active hydrogen compound are reacted to obtain the reaction liquid including the first intermediate reaction product; next, the first intermediate reaction product and the cationic active hydrogen compound are reacted to obtain the reaction liquid including the second intermediate reaction product; and next, the second intermediate reaction product and the acid compound are reacted. However, the order of the reaction is not particularly limited, and for example, the aliphatic polyisocyanate derivative and the cationic active hydrogen compound are reacted, and thereafter, the long-chain active hydrogen compound and the acid compound may be also reacted. Further, the aliphatic polyisocyanate derivative, the long-chain active hydrogen compound, the cationic active hydrogen compound, and the acid compound may be also collectively blended to be reacted.

Then, the polyurethane resin composition can be used as, for example, a water repellent treatment liquid which is diluted with water (ion-exchanged water).

By impregnating the water repellent treatment liquid with the fibers (fiber products) to be described later, it is possible to impart oil repellency, oil resistance, and stain-proof properties to the fibers (fiber products).

In addition, a blocked isocyanate composition may be blended into the water repellent treatment liquid.

The blocked isocyanate composition contains a blocked isocyanate in which an isocyanate group of a reaction product of a polyisocyanate and a hydrophilic group-containing active hydrogen compound is blocked by a blocking agent.

As the polyisocyanate, preferably, an aliphatic polyisocyanate derivative is used. More preferably, an isocyanurate derivative of hexamethylene diisocyanate is used.

The hydrophilic group-containing active hydrogen compound is a compound including hydrophilic groups such as nonionic groups including a polyoxyethylene group and ionic groups including an anionic group or a cationic group, and an active hydrogen group in combination. Examples thereof include anionic active hydrogen compounds such as 2,2-dimethylolpropionic acid, the above-described cationic active hydrogen compounds, and nonionic active hydrogen compounds such as methoxypolyoxyethylene glycol. Preferably, a cationic active hydrogen compound is used. More preferably, N-methyldiethanolamine is used.

Preferably, the blocked isocyanate composition contains a blocked isocyanate in which an isocyanate group of a reaction product of an aliphatic polyisocyanate and a cationic active hydrogen compound is blocked by the blocking agent.

The blocking agent is not particularly limited, and a known blocking agent is used, and examples thereof include pyrazole-based compounds such as 3,5-dimethylpyrazole.

Then, in order to obtain such a blocked isocyanate composition, first, the aliphatic polyisocyanate derivative and the cationic active hydrogen compound are reacted.

Thereafter, the blocking agent is blended into the reaction liquid including the reaction product of the aliphatic polyisocyanate derivative and the cationic active hydrogen compound, and the isocyanate group of the reaction product is blocked.

Thereafter, the cationic group of the reaction product is neutralized with the acid compound, thereby obtaining the blocked isocyanate composition.

The mixing ratio of the blocked isocyanate composition with respect to the water repellent treatment liquid is, for example, 20% by mass or more, and for example, 40% by mass or less.

Further, the mixing ratio of the blocked isocyanate composition with respect to 100 parts by mass of the total amount of the polyurethane resin composition and the blocked isocyanate composition is, for example, 20 parts by mass or more, and for example, 40 parts by mass or less.

As described above, since the above-described polyurethane resin composition has excellent oil repellency and oil resistance, while having excellent water repellency, it can be preferably used as a repellent (as a component of a repellent).

Specifically, the repellent of the present invention is a water repellent, an oil repellent, and an oil resistant agent, and contains the above-described polyurethane resin composition.

Since the repellent contains the above-described polyurethane resin composition, it has excellent water repellency, oil repellency, and oil resistance, and also has excellent washing durability against the fibers (described later).

An object to be treated with such a repellent is not particularly limited, and examples thereof include fibers (fiber product) (described later), paper, stone materials, glass, metals, cement, and resin films.

Further, as described above, since the above-described polyurethane resin composition has excellent washing durability against the fibers, it can be more preferably used as a component of a water repellent (water repellent for fibers) for use in the fibers (fiber products).

The water repellent for fibers of the present invention is for subjecting the fibers (fiber products) to water repellent treatment, and contains the above-described polyurethane resin composition.

Examples of the fibers include natural fibers such as cotton or wool, chemical fibers such as viscose rayon and lyocell, and synthetic fibers such as polyester, polyamide, acryl, and polyurethane fibers. Further, the fiber product is a product using the above-described fibers as a material, and an example thereof includes cloth (woven fabric, knitted fabric, and nonwoven fabric).

Since the water repellent for fibers contains the above-described polyurethane resin composition, it has excellent water repellency, and also has excellent washing durability against the fibers.

Further, as described above, since the above-described polyurethane resin composition has excellent stain-proof properties, it can be preferably used as a component of a stain-proof coating agent.

The stain-proof coating agent of the present invention includes the above-described polyurethane resin composition.

Since the stain-proof coating agent includes the above-described polyurethane resin composition, it has excellent stain-proof properties.

An object to be treated with such a stain-proof coating agent is not particularly limited, and an example thereof includes the one illustrated as the object to be treated of the repellent.

EXAMPLES

The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS". All designations of "part" or "parts" and "%" mean part or parts by mass and % by mass, respectively, unless otherwise particularly specified.

1. Preparation of Aliphatic Polyisocyanate Derivative

Synthetic Example 1 (Isocyanurate Derivative of Hexamethylene Diisocyanate)

In a reactor equipped with a thermometer, a stirrer, a nitrogen introducing tube, and a condenser tube, 500 parts by mass of 1,6-hexamethylene diisocyanate (HDI, manufactured by Mitsui Chemicals, Inc., trade name: TAKENATE 700), 0.25 parts by mass of 2,6-di(tert-butyl)-4-methylphenol (also known as dibutylhydroxytoluene, BHT, hindered phenol antioxidant), and 0.25 parts by mass of tetraphenyldipropyleneglycoldiphosphite (organic phosphite, co-catalyst) were mixed under a nitrogen atmosphere, thereafter, 10.7 parts by mass of 1,3-butanediol was added to the resulting liquid mixture, and nitrogen was introduced into the liquid phase for one hour. Thereafter, the liquid mixture was heated to 80° C. to be reacted for three hours, and then, the temperature thereof was lowered to 60° C. Thereafter, 0.2 parts by mass of trimethyl-N-2-hydroxypropylammonium2-ethylhexanoate, as an isocyanurate catalyst, was added thereto to be reacted for 1.5 hours. Thereafter, 0.04 parts by mass of o-toluenesulfonamide was added to 100 parts by mass of HDI. Thereafter, the reaction liquid mixture was passed through a thin-film distillation device (temperature of 150° C., vacuum degree of 93.3 Pa), and distilled until the residual HDI monomer amount was 0.5% or less, thereby obtaining an aliphatic polyisocyanate derivative (isocyanurate derivative of hexamethylene diisocyanate). The obtained aliphatic polyisocyanate derivative had an isocyanate group content of 20.9%, and an average number of isocyanate functional groups of 3.0.

Synthetic Example 2 (Isocyanurate Derivative of Bis(Isocyanatomethyl) Cyclohexane)

A reactor equipped with a thermometer, a stirrer, a nitrogen introducing tube, and a condenser tube was charged with 485.2 g of bis(isocyanatomethyl)cyclohexane ($H_6XDI$, manufactured by Mitsui Chemicals, Inc., trade name: TAKENATE 600) and 14.8 g of isobutyl alcohol to be heated to 90° C. and held for two hours. Thereafter, 0.2 g of trimethyl-N-2-hydroxypropylammonium 2-ethylhexanoate, as a reaction catalyst, was added thereto, and the reaction was carried out for two hours, while the reaction temperature was adjusted to 90±5° C. Thereafter, 0.02 g of o-toluenesulfonamide, as a catalyst deactivator, was added to deactivate the reaction catalyst, and the reaction was stopped. Thereafter, the reaction liquid mixture was passed through a thin-film distillation device (temperature of 150° C., vacuum degree of 93.3 Pa), and distilled until the residual $H_6XDI$ monomer amount was 0.5% or less. The obtained reaction liquid had an isocyanate group content of 20.2%. Further, ethyl acetate was added to the reaction liquid, thereby obtaining a reaction liquid containing an aliphatic polyisocyanate derivative (isocyanurate derivative of bis(isocyanatomethyl)cyclohexane) having the concentration of 75%. The obtained aliphatic polyisocyanate derivative had an isocyanate group content of 15.2%, and an average number of isocyanate functional groups of 3.0.

Synthetic Example 3 (Trimethylolpropane Adduct of Hexamethylene Diisocyanate)

A reactor equipped with a thermometer, a stirrer, a nitrogen introducing tube, and a condenser tube was charged with 500 parts by mass of 1,6-hexamethylene diisocyanate (HDI, manufactured by Mitsui Chemicals, Inc., trade name: TAKENATE 700), and 45.8 parts by mass of trimethylolpropane (abbreviated as TMP) under a nitrogen atmosphere. The temperature of the charged mixture was increased to 75° C. under a nitrogen atmosphere, and after confirming that the trimethylolpropane was dissolved, the reaction was carried out at 83° C. until the isocyanate group concentration reached 37.9% of a calculated value (theoretical amount of the unreacted isocyanate group). Thereafter, the reaction liquid was lowered to 55° C., and 350 parts by mass of mixed extraction solvent (n-hexane/ethyl acetate=90/10 (mass ratio)) was added thereto, stirred for 10 minutes, left to stand for 10 minutes, and then, the extraction solvent layer was removed. The same extraction procedure was repeated four times. Thereafter, the mixture was heated to 80° C. under a reduced pressure to remove the extraction solvent remaining in the reaction liquid from the obtained reaction liquid. The isocyanate group concentration of this reaction liquid was 17.1% by mass. Further, ethyl acetate was added to obtain a reaction liquid containing an aliphatic polyisocyanate derivative (trimethylolpropane adduct of hexamethylene diisocyanate) having the concentration of 75%. The obtained aliphatic polyisocyanate derivative had an isocyanate group content of 12.8%, and an average number of isocyanate functional groups of 3.3.

Synthetic Example 4 (Allophanate Derivative of Hexamethylene Diisocyanate)

A reactor equipped with a thermometer, a stirrer, a nitrogen introducing tube, and a condenser tube was charged with 500 parts by mass of 1,6-hexamethylene diisocyanate (HDI, manufactured by Mitsui Chemicals, Inc., trade name: TAKENATE 700), 24 parts by mass of isobutyl alcohol, 0.3 parts by mass of 2,6-di(tert-butyl)-4-methylphenol (also known as dibutylhydroxytoluene, BHT, hindered phenol antioxidant), and 0.30 pats by mass of tris(tridecyl)phosphite under a nitrogen atmosphere, and the charged mixture was subjected to a urethane-forming reaction at 85° C. for three hours. Thereafter, 0.02 parts by mass of tris(2-ethylhexanoic acid) bismuth, as an allophanate catalyst, was added, the mixture was reacted until the isocyanate group concentration reached a calculated value (46.7%), and then, 0.02 parts by mass of o-toluenesulfonamide was added. Thereafter, the reaction liquid mixture was passed through a thin-film distillation device (temperature of 150° C., vacuum degree of 93.3 Pa), and distilled until the residual HDI monomer amount was 0.5% or less. Thereafter, 0.02 parts by mass of o-toluenesufonamide was added to 100 parts by mass of reaction liquid, thereby obtaining an aliphatic polyisocyanate derivative (allophanate derivative of hexamethylene diisocyanate). The obtained aliphatic polyisocyanate derivative had an isocyanate group content of 19.3%, and an average number of isocyanate functional groups of 2.1.

Synthetic Example 5 (Biuret Derivative of Hexamethylene Diisocyanate)

A reactor equipped with a thermometer, a stirrer, a nitrogen introducing tube, and a condenser tube was charged with 500 parts by mass of 1,6-hexamethylene diisocyanate (HDI, manufactured by Mitsui Chemicals, Inc., trade name: TAKENATE 700), 0.3 parts by mass of tris(tridecyl)phosphite, 8 parts by mass of trimethyl phosphoric acid, and 3.57 parts by mass of water under a nitrogen atmosphere, and the temperature of the charged mixture was increased to 130° C. to be reacted until the isocyanate group content reached 44.6%. Thereafter, the reaction liquid mixture was passed through a thin-film distillation device (temperature of 150° C., vacuum degree of 93.3 Pa), and distilled until the residual HDI monomer amount was 0.5% or less. Thus, the aliphatic polyisocyanate derivative (biuret derivative of hexamethylene diisocyanate) was obtained. The obtained aliphatic polyisocyanate derivative had an isocyanate group content of 22.6%, and an average number of isocyanate functional groups of 2.8.

2. Preparation of Polyurethane Resin Composition and Water Repellent Treatment Liquid Example 1

In a reactor equipped with a stirrer, a thermometer, a condenser tube, and a nitrogen introducing tube, 100.08 g of aliphatic polyisocyanate derivative of Synthetic Example 1, as an aliphatic polyisocyanate derivative, and 90.03 g of KALCOL 8098 (stearyl alcohol, manufactured by Kao Corporation), as a long-chain active hydrogen compound, were mixed, and reacted at 110° C. for four hours under a nitrogen atmosphere until the isocyanate group content was 3.67%.

Then, the reaction liquid was cooled to 80° C., and 9.89 g of N-methyldiethanolamine, as a cationic active hydrogen compound, was added thereto to be reacted at 80° C. for one hour.

Then, 50.00 g of methyl ethyl ketone, as a solvent, was added, and the mixture was reacted at 80° C. until it was confirmed that the isocyanate group disappeared by infrared absorption spectrum.

Then, 57.69 g of methyl ethyl ketone was added to the reaction liquid, the temperature of the resulting liquid was increased to 80° C., and it was mixed until the reaction liquid was completely dissolved to be then cooled to 75° C.

Thereafter, 18.93 g of acetic acid, as an acid compound, was added to be neutralized.

Then, 800.0 g of ion-exchanged water heated at 70° C. was gradually added to be emulsified (internally emulsified), while the reaction liquid was kept at 75° C.

Then, the resulting reaction liquid was desolvated with an evaporator at a water bath temperature of 60° C. under a reduced pressure until the solid content concentration thereof was 20% by mass or more.

Then, an aqueous dispersion liquid including a reaction product of the aliphatic polyisocyanate derivative, the long-chain active hydrogen compound, the cationic active hydrogen compound, and the acid compound (aqueous dispersion liquid containing a polyurethane resin composition) was obtained by adjusting with ion-exchanged water so that the solid content concentration excluding the acid compound (acetic acid) was 20% by mass.

Further, 95 g of ion-exchanged water was added to 5 g of the obtained aqueous dispersion liquid containing the polyurethane resin composition and diluted, thereby preparing a water repellent treatment liquid so that the solid content concentration excluding the acid compound was 1%.

Examples 2, 3, 5, and 8 to 11, and Comparative Example 1

An aqueous dispersion liquid containing a polyurethane resin composition, and a water repellent treatment liquid were prepared in the same manner as in Example 1, except that the mixing formulation was changed in accordance with Table 1.

Example 4

An aqueous dispersion liquid containing a polyurethane resin composition was produced in the same manner as in Example 1, except that the mixing formulation was changed in accordance with Table 1.

Then, the polyurethane resin composition and the blocked isocyanate composition of Reference Example 1 to be described later were mixed so as to be 7:3. Then, 95 g of ion-exchanged water was added to 5 g of the mixture to be diluted, and a water repellent treatment liquid was prepared so that the solid content concentration excluding the acid compound was 1%.

Example 6

In a reactor equipped with a stirrer, a thermometer, a condenser tube, and a nitrogen gas introducing tube, 79.88 g of aliphatic polyisocyanate derivative of Synthetic Example 1, as an aliphatic polyisocyanate derivative, 27.55 g of aliphatic polyisocyanate derivative of Synthetic Example 2, 67.37 g of KALCOL 8098 (stearyl alcohol, manufactured by Kao Corporation), as a long-chain active hydrogen compound, and 22.22 g of oleyl alcohol were mixed, and reacted at 80° C. under a nitrogen atmosphere until the isocyanate group concentration per solid content was 3.66%.

Then, 9.86 g of N-methyldiethanolamine, as a cationic active hydrogen compound, was added and reacted at 80° C. for one hour.

Then, 78.83 g of methyl ethyl ketone was added to the reaction liquid, and the resulting reaction liquid was reacted at 80° C. until it was confirmed that the isocyanate group disappeared by infrared absorption spectrum.

Then, 77.92 g of methyl ethyl ketone was added to the reaction liquid, the temperature of the resulting liquid was increased to 80° C., and it was mixed until the reaction liquid was completely dissolved to be then cooled to 75° C.

Thereafter, 18.89 g of acetic acid, as an acid compound, was added to be neutralized.

Then, 800.0 g of ion-exchanged water heated at 70° C. was gradually added to be emulsified (internally emulsified), while the reaction liquid was kept at 75° C.

Then, the resulting reaction liquid was desolvated with an evaporator at a water bath temperature of 60° C. under a reduced pressure until the solid content concentration thereof was 20% by mass or more.

Then, an aqueous dispersion liquid including a reaction product of the aliphatic polyisocyanate derivative, the long-chain active hydrogen compound, the cationic active hydrogen compound, and the acid compound (aqueous dispersion liquid containing a polyurethane resin composition) was obtained by adjusting with ion-exchanged water so that the solid content concentration excluding the acid compound (acetic acid) was 20% by mass.

Further, 95 g of ion-exchanged water was added to 5 g of the obtained aqueous dispersion liquid containing the polyurethane resin composition and diluted, thereby preparing a water repellent treatment liquid so that the solid content concentration excluding the acid compound was 1%.

Example 7

An aqueous dispersion liquid containing a polyurethane resin composition, and a water repellent treatment liquid were prepared in the same manner as in Example 6, except that the mixing formulation was changed in accordance with Table 1.

Comparative Example 2

In a reactor equipped with a stirrer, a thermometer, a condenser tube, and a nitrogen gas introducing tube, 99.46 g of aliphatic polyisocyanate derivative of Synthetic Example 1, and 89.48 g of KALCOL 8098 (stearyl alcohol, manufactured by Kao Corporation), as a long-chain active hydrogen compound, were mixed, and reacted at 110° C. for four hours under a nitrogen atmosphere until the isocyanate group concentration per solid content was 3.67%.

Next, the reaction liquid was cooled to 80° C., and 11.06 g of dimethylolpropionic acid was added to be reacted at 80° C. for one hour.

Then, 85.71 g of methyl ethyl ketone was added to the reaction liquid, and the resulting reaction liquid was reacted at 80° C. until it was confirmed that the isocyanate group disappeared by infrared absorption spectrum.

Then, 98.90 g of methyl ethyl ketone was added to the reaction liquid, the temperature of the resulting liquid was increased to 80° C., and it was mixed until the reaction liquid was completely dissolved to be then cooled to 75° C.

Next, 25.03 g of triethylamine, as a neutralizing agent, was added to be neutralized.

Then, 800.0 g of ion-exchanged water heated at 70° C. was gradually added to be emulsified (internally emulsified), while the reaction liquid was kept at 75° C.

Then, the resulting reaction liquid was desolvated with an evaporator at a water bath temperature of 60° C. under a reduced pressure until the solid content concentration thereof was 20% by mass or more.

Then, an aqueous dispersion liquid containing a polyurethane resin composition was obtained by adjusting with ion-exchanged water so that the solid content concentration excluding the neutralizing agent (triethylamine) was 20% by mass.

Further, 95 g of ion-exchanged water was added to 5 g of the obtained aqueous dispersion liquid containing the polyurethane resin composition and diluted, thereby preparing a water repellent treatment liquid so that the solid content concentration excluding the neutralizing agent was 1%.

Comparative Example 3

To a 250-ml four-neck round bottom flask equipped with an overhead stirrer, a thermocouple, and a Dean-Stark/condenser, 116.0 g of RHEODOL SP-530V (sorbitan tristearate, manufactured by Kao Corporation) and 150 g of 4-methyl-2-pentanone (MIBK) were added. The obtained reaction liquid was refluxed for one hour to remove all the residual moisture. In one hour, the reaction liquid was cooled to 50° C., 30 g of Desmodur (DESMODUR)N-100 (biuret derivative of hexamethylene diisocyanate, manufactured by Bayer Holding Ltd.) was added, and then, a catalyst was added to heat the solution to 80° C. for one hour. Thus, a sorbitan urethane/MIBK solution was prepared.

Separately, 300 g of water, 5.6 g of Armeen (ARMEEN) DM-18D (manufactured by Akzo Nobel Coatings K.K., N,N-dimethyl-n-octadecylamine), 2.8 g of Tergitol (TERGITOL) TMN-10 (manufactured by Sigma-Aldrich Co. LLC, polyethylene glycol trimethylnonyl ether), and 3.4 g of acetic acid were added to a beaker to be stirred, thereby producing a surfactant solution, and the obtained surfactant solution was heated to 60° C. Next, the above-described sorbitan urethane/MIBK solution was cooled to 60° C., and the surfactant solution was slowly added to the sorbitan urethane/MIBK solution, thereby obtaining a mixture. Thus, a milky emulsion was produced (externally emulsified). The mixture was homogenized at 41 MPa (6000 psi), and the resulting emulsion was distilled under a reduced pressure to remove the solvent, thereby obtaining an aqueous dispersion liquid containing 25% by mass of polyurethane resin composition.

Further, 95 g of ion-exchanged water was added to 5 g of the obtained aqueous dispersion liquid containing the polyurethane resin composition and diluted, thereby preparing a water repellent treatment liquid so that the solid content concentration excluding the acid compound was 1%.

Reference Example 1

In a reactor equipped with a stirrer, a thermometer, a condenser tube, and a nitrogen gas introducing tube, 141.09 g of aliphatic polyisocyanate derivative of Synthetic Example 1, 13.94 g of N-methyldiethanol amine, as a cationic active hydrogen compound, and 85.71 g of methyl ethyl ketone, as a solvent, were mixed, and the temperature thereof was increased to 60° C. for two hours under a nitrogen atmosphere, and thereafter to 70° C. to be reacted until the isocyanate group concentration per solid content was 12.7%.

Then, the reaction liquid was cooled to 22° C., and 44.97 g of 3,5-dimethylpyrazole, as a blocking agent, was added in several portions so that the temperature of the reaction liquid did not exceed 50° C., followed by reaction at 50° C. for one hour, and it was confirmed that the isocyanate group was blocked by infrared absorption spectrum.

The reaction liquid was then cooled to 25° C., and 7.02 g of acetic acid, as an acid compound, was added to be neutralized.

Then, 800.0 g of ion-exchanged water was gradually added to the reaction liquid to be emulsified.

Then, the resulting reaction liquid was desolvated with an evaporator at a water bath temperature of 40° C. under a reduced pressure until the solid content concentration thereof was 20% by mass or more.

Then, a blocked isocyanate composition was obtained by adjusting with ion-exchanged water so that the solid content concentration excluding the acid compound (acetic acid) was 20% by mass.

Further, 95 g of ion-exchanged water was added to 5 g of the obtained aqueous dispersion liquid containing the blocked isocyanate composition and diluted, thereby preparing a water repellent treatment liquid so that the solid content concentration excluding the acid compound was 1%.

3. Evaluation a) Average Number of Isocyanate Functional Groups

An average number of isocyanate functional groups of each of the aliphatic polyisocyanate derivatives of Synthetic Examples was calculated from the isocyanate group concentration A of the aliphatic polyisocyanate derivative, the solid content concentration B, and the number average molecular weight C of gel permeation chromatography measured by the following device and conditions by the following formula (1).

$$\text{Average Number of Isocyanate Functional Groups} = A/B \times C/42.02 \quad (1)$$

(In formula, A represents the isocyanate group concentration of the aliphatic polyisocyanate derivative, B represents the solid content concentration, and C represents a number average molecular weight.)

In addition, an average number of isocyanate functional groups of Examples 6 to 9 in which two or more kinds of aliphatic polyisocyanate derivatives were used in combination was calculated by a weight ratio of the aliphatic polyisocyanate derivative and the average number of isocyanate functional groups thereof. The results are shown in Table 1.

(Measurement Conditions of Number Average Molecular Weight)
Device: HLC-8220GPC (manufactured by TOSOH CORPORATION)
Column: TSKgel G1000HXL, TSKgel G2000HXL, and TSKgel G3000HXL (manufactured by TOSOH CORPORATION) were connected in series
Detector: differential refractometer
Injection volume: 100 µL
Eluent: tetrahydrofuran
Flow rate: 0.8 mL/min
Temperature: 40° C.
Calibration curve: standard polyethylene oxide in a range of 106 to 22450 (manufactured by TOSOH CORPORATION, trade name: TSK standard polyethylene oxide)

b) Water Repellency and Washing Durability
(Preparation of Treatment Cloth)

A test cotton fabric (cannequin No. 3) was immersed in each of the water repellent treatment liquids of Examples and Comparative Examples by one time, and thereafter, the test cotton fabric was squeezed by one time (pick up of 100%) to be then dried at 110° C. for two minutes.

Thereafter, the squeezed test cotton fabric was heated at 170° C. for two minutes to obtain a treatment cloth (170° C. for two minutes), and separately, heated at 170° C. for 10 minutes to obtain a treatment cloth (170° C. for 10 minutes).
(Water Repellency before Washing)

To each of the treatment cloth (170° C. for two minutes) and the treatment cloth (170° C. for 10 minutes) of Examples and Comparative Examples, 10 drops of water were dropped with a dropper, and the number of water drops which remained without being soaked in the treatment cloth was measured.

The measurement was carried out after an elapse of 15 minutes and 30 minutes after dropping 10 drops of water with a dropper. The results are shown in Table 2.
(Water Repellency after Washing)

After washing each of the treatment cloth (170° C. for two minutes) and the treatment cloth (170° C. for 10 minutes) of Examples and Comparative Examples by the following conditions (after washing five times or 10 times), 10 drops of water were dropped with a dropper, and the number of water drops which remained without being soaked in the treatment cloth was measured. Measurement was carried out after an elapse of 15 minutes, 30 minutes, and 90 minutes after dropping 10 drops of water with a dropper. The results are shown in Table 2.
<Washing Conditions>
Washing: Toshiba AW-F42S (pulsator system washing machine) standard mode
Detergent: concentration (about 43 g of detergent with respect to 45 L of water) described in synthetic detergent for washing: Bold Fresh Pure Clean (manufactured by The P&G Japan Limited)
Drying: Toshiba ED-50 (tumbler dryer) standard mode
(Evaluation of Water Repellency and Washing Durability)

For Examples and Comparative Examples, the water repellency was evaluated based on the following criteria. The results are shown in Table 2.

Excellent: for the treatment cloth (170° C. for 10 minutes), the number of water drops in both the water repellency evaluation before washing (after an elapse of 15 minutes) and the water repellency evaluation before washing (after an elapse of 30 minutes) was 10.

Good: for the treatment cloth (170° C. for 10 minutes), the number of water drops in at least one of the water repellency evaluation before washing (after an elapse of 15 minutes) and the water repellency evaluation before washing (after an elapse of 30 minutes) was 1 or more and below 10.

Bad: for the treatment cloth (170° C. for 10 minutes), the number of water drops in at least one of the water repellency evaluation before washing (after an elapse of 15 minutes) and the water repellency evaluation before washing (after an elapse of 30 minutes) was 0.

For Examples and Comparative Examples, the washing durability was evaluated based on the following criteria. The results are shown in Table 2.

Excellent: for the treatment cloth (170° C. for 10 minutes), the number of water drops in both the water repellency evaluation after washing (after washing 10 times, after an elapse of 15 minutes) and the water repellency evaluation after washing (after washing 10 times, after an elapse of 30 minutes) was 10.

Good: for the treatment cloth (170° C. for 10 minutes), the number of water drops in at least one of the water repellency evaluation after washing (after washing 10 times, after an elapse of 15 minutes) and the water repellency evaluation after washing (after washing 10 times, after an elapse of 30 minutes) was 1 or more and below 10.

Bad: for the treatment cloth (170° C. for 10 minutes), the number of water drops in at least one of the water repellency evaluation after washing (after washing 10 times, after an elapse of 15 minutes) and the water repellency evaluation after washing (after washing 10 times, after an elapse of 30 minutes) was 0.

(Stain-Proof Properties)

The water repellent treatment liquid of Example 2 was applied to each of the substrates (glass, bonderized steel plate, acryl (white), and PET film) under the following conditions, thereby producing a coating film.

The water repellent treatment liquid of Example 2 was applied to a half of one surface of glass with a bar coater so that the thickness thereof after drying was about 5 µm, then, dried at room temperature, and further heated at 110° C. for one hour. Thus, a coating film was obtained, and a coated portion on which a coating film was formed and a non-coated portion on which a coating film was not formed were formed on one surface of the glass.

Separately, the water repellent treatment liquid of Example 2 was applied to a half of one surface of a bonderized steel plate (manufactured by Standard Test Piece) with a bar coater so that the thickness thereof after drying was about 5 µm, then, dried at room temperature, and further heated at 110° C. for one hour. Thus, a coating film was obtained, and a coated portion on which a coating film was formed and a non-coated portion on which a coating film was not formed were formed on one surface of the bonderized steel plate.

Separately, the water repellent treatment liquid of Example 2 was applied to a half of one surface of acryl (white) (manufactured by Standard Test Piece) with a bar coater so that the thickness thereof after drying was about 5 µm, then, dried at room temperature, and further heated at 110° C. for one hour. Thus, a coating film was obtained, and a coated portion on which a coating film was formed and a non-coated portion on which a coating film was not formed were formed on one surface of the acryl (white).

Separately, the water repellent treatment liquid of Example 2 was applied to a half of one surface of a PET film (manufactured by TOYOBO CO., LTD., trade name: E5102, thickness of 12 µm) with a bar coater so that the thickness thereof after drying was about 2 µm, and then, heated at 110° C. for two minutes. Thus, a coating film was obtained, and a coated portion on which a coating film was formed and a non-coated portion on which a coating film was not formed were formed on one surface of the PET film.

Water was dropped on the coated portion and the non-coated portion on one surface of each of the substrates.

In all of the substrates, the coated portion was more likely to be repellent against water as compared with the non-coated portion.

Thus, it was found that when the polyurethane resin composition was used, the water repellency could be imparted to each of the substrates.

Further, it was found that when the coated portion of each of the substrates was wiped with water, the trace of the fingerprint adhering to the coated portion could be easily removed.

Thus, it was found that when the polyurethane resin composition was used, the stain-proof properties could be imparted to each of the substrates.

TABLE 1

| Ex. No. | | Ex. 1 | Ex. 2 | Ex. 3 | Ex. 4 | Ex. 5 | Ex. 6 |
|---|---|---|---|---|---|---|---|
| Aliphatic Polyisocyanate Derivative | Aliphatic Polyisocyanate Derivative of Synthetic Example 1 (Isocyanurate Modified Product of Hexamethylene Diisocyanate, Average Number of Isocyanate Groups of 3.0) | 100.08 | 100.20 | 100.27 | 100.32 | 83.05 | 79.88 |
| | Aliphatic Polyisocyanate Derivative of Synthetic Example 2 (Isocyanurate Modified Product of Bis(Isocyanatomethyl)Cyclohexane, Average Number of Isocyanate Groups of 3.0) | — | — | — | — | — | 27.55 |
| | Aliphatic Polyisocyanate Derivative of Synthetic Example 3 (Trimethylolpropane Adduct of Hexamethylene Diisocyanate, Average Number of Isocyanate Groups of 3.3) | — | — | — | — | — | — |
| | Aliphatic Polyisocyanate Derivative of Synthetic Example 4 (Allophanate Modified Product of Hexamethylene Diisocyanate, Average Number of Isocyanate Groups of 2.1) | — | — | — | — | — | — |
| | Aliphatic Polyisocyanate Derivative of Synthetic Example 5 (Biuret Modified Product of Hexamethylene Diisocyanate, Average Number of Isocyanate Groups of 2.8) | — | — | — | — | — | — |
| | N-100 (Biuret Derivative of Hexamethylene Diisocyanate) | | | | | | |

TABLE 1-continued

Table 1

|  |  |  |  |  |  |  |  |
|---|---|---|---|---|---|---|---|
| Long-Chain Active Hydrogen Compound | KALCOL 8098 (Stearyl Alcohol) | 90.03 | 67.60 | 54.12 | 45.12 | 37.35 | 67.37 |
|  | Oleyl Alcohol | — | 22.30 | 35.71 | 44.65 | 18.48 | 22.22 |
|  | RHEODOL SP-S30 (Sorbitan Tristearate) | — | — | — | — | 52.91 | — |
| Active Hydrogen Compound Having Carbon Atoms of 11 or less | 1-Decanol | — | — | — | — | — | — |
|  | 2-Ethylhexanol | — | — | — | — | — | — |
| Cationic Active Hydrogen Compound | N-Methyldiethanolamine | 9.89 | 9.90 | 9.90 | 9.91 | 8.20 | 9.86 |
| Anionic Active Hydrogen Compound | 2,2-Dimethylol Propionic Acid (DMPA) | — | — | — | — | — | — |
| Blocking Agent | 3,5-Dimethylpyrazol | — | — | — | — | — | — |
| Acid Compound | Acetic Acid | 18.93 | 18.95 | 18.97 | 18.98 | 15.71 | 18.89 |
|  | Hydrochloric Acid (35% Aqueous Solution) | — | — | — | — | — | — |
|  | Lactic Acid | — | — | — | — | — | — |
| Neutralizing Agent | Triethylamine | — | — | — | — | — | — |
| Solvent | Methyl Ethyl Ketone (First Time) | 50.00 | 50.00 | 50.00 | 50.00 | 50.00 | 78.83 |
|  | Methyl Ethyl Ketone (Second Time) | 57.69 | 57.69 | 57.69 | 57.69 | 57.69 | 77.92 |
|  | MIBK | — | — | — | — | — | — |
| Emulsifier | DM-18D | — | — | — | — | — | — |
|  | TMN-10 | — | — | — | — | — | — |
| Ion-Exchanged Water |  | 800.00 | 800.00 | 800.00 | 800.00 | 800.00 | 800.00 |
| Isocyanate Group Concentration (Solid Content) |  | 3.67 | 3.67 | 3.67 | 3.68 | 3.02 | 3.66 |
| Average Number of Isocyanate Groups of Aliphatic Polyisocyanate Derivative |  | 3.0 | 3.0 | 3.0 | 3.0 | 3.0 | 3.0 |
| Hydrocarbon Group Concentration |  | 42 | 42 | 42 | 42 | 46 | 42 |

|  | Ex. No. | Ex. 7 | Ex. 8 | Ex. 9 | Ex. 10 | Ex. 11 | Comparative Ex. 1 |
|---|---|---|---|---|---|---|---|
| Aliphatic Polyisocyanate Derivative | Aliphatic Polyisocyanate Derivative of Synthetic Example 1 (Isocyanurate Modified Product of Hexamethylene Diisocyanate, Average Number of Isocyanate Groups of 3.0) | 78.41 | 79.50 | 80.76 | 100.20 | 100.20 | 126.81 |
|  | Aliphatic Polyisocyanate Derivative of Synthetic Example 2 (Isocyanurate Modified Product of Bis(Isocyanatomethyl)Cyclohexane, Average Number of Isocyanate Groups of 3.0) | — | — | — | — | — | — |
|  | Aliphatic Polyisocyanate Derivative of Synthetic Example 3 (Trimethylolpropane Adduct of Hexamethylene Diisocyanate, Average Number of Isocyanate Groups of 3.3) | 31.94 | — | — | — | — | — |
|  | Aliphatic Polyisocyanate Derivative of Synthetic Example 4 (Allophanate Modified Product of Hexamethylene Diisocyanate, Average Number of Isocyanate Groups of 2.1) | — | 21.52 | — | — | — | — |
|  | Aliphatic Polyisocyanate Derivative of Synthetic Example 5 (Biuret Modified Product of Hexamethylene Diisocyanate, Average Number of Isocyanate Groups of 2.8) | — | — | 18.67 | — | — | — |
|  | N-100 (Biuret Derivative of Hexamethylene Diisocyanate) | — | — | — | — | — | — |
| Long-Chain Active Hydrogen Compound | KALCOL 8098 (Stearyl Alcohol) | 66.13 | 67.05 | 68.12 | 67.60 | 67.60 | — |
|  | Oleyl Alcohol | 21.82 | 22.12 | 22.47 | 22.30 | 22.30 | — |
|  | RHEODOL SP-S30 (Sorbitan Tristearate) | — | — | — | — | — | — |
| Active Hydrogen Compound Having Carbon Atoms of 11 or less | 1-Decanol | — | — | — | — | — | 33.28 |
|  | 2-Ethylhexanol | — | — | — | — | — | 27.38 |
| Cationic Active Hydrogen Compound | N-Methyldiethanolamine | 9.68 | 9.82 | 9.97 | 9.90 | 9.90 | 12.53 |
| Anionic Active Hydrogen Compound | 2,2-Dimethylol Propionic Acid (DMPA) | — | — | — | — | — | — |
| Blocking Agent | 3,5-Dimethylpyrazol | — | — | — | — | — | — |
| Acid Compound | Acetic Acid | 18.54 | 18.80 | 19.10 | — | — | 23.99 |
|  | Hydrochloric Acid (35% Aqueous Solution) | — | — | — | 3.03 | — | — |
|  | Lactic Acid | — | — | — | — | 7.48 | — |

TABLE 1-continued

Table 1

|  |  |  |  |  |  |  |  |
|---|---|---|---|---|---|---|---|
| Neutralizing Agent | Triethylamine | — | — | — | — | — | — |
| Solvent | Methyl Ethyl Ketone (First Time) | 77.73 | 85.71 | 85.71 | 50.00 | 50.00 | 50.00 |
|  | Methyl Ethyl Ketone (Second Time) | 77.92 | 77.92 | 77.92 | 57.69 | 57.69 | 57.69 |
|  | MIBK | — | — | — | — | — | — |
| Emulsifier | DM-18D | — | — | — | — | — | — |
|  | TMN-10 | — | — | — | — | — | — |
| Ion-Exchanged Water |  | 800.00 | 800.00 | 800.00 | 800.00 | 800.00 | 800.00 |
| Isocyanate Group Concentration (Solid Content) |  | 3.59 | 3.64 | 3.70 | 3.67 | 3.67 | 4.71 |
| Average Number of Isocyanate Groups of Aliphatic Polyisocyanate Derivative |  | 3.1 | 2.8 | 3.0 | 3.0 | 3.0 | 3.0 |
| Hydrocarbon Group Concentration |  | 41 | 42 | 42 | 42 | 42 | 27 |

| Ex. No. |  | Comparative Ex. 2 | Comparative Ex. 3 | Reference Ex. 1 |
|---|---|---|---|---|
| Aliphatic Polyisocyanate Derivative | Aliphatic Polyisocyanate Derivative of Synthetic Example 1 (Isocyanurate Modified Product of Hexamethylene Diisocyanate, Average Number of Isocyanate Groups of 3.0) | 99.46 | — | 141.09 |
|  | Aliphatic Polyisocyanate Derivative of Synthetic Example 2 (Isocyanurate Modified Product of Bis(Isocyanatomethyl)Cyclohexane, Average Number of Isocyanate Groups of 3.0) | — | — | — |
|  | Aliphatic Polyisocyanate Derivative of Synthetic Example 3 (Trimethylolpropane Adduct of Hexamethylene Diisocyanate, Average Number of Isocyanate Groups of 3.3) | — | — | — |
|  | Aliphatic Polyisocyanate Derivative of Synthetic Example 4 (Allophanate Modified Product of Hexamethylene Diisocyanate, Average Number of Isocyanate Groups of 2.1) | — | — | — |
|  | Aliphatic Polyisocyanate Derivative of Synthetic Example 5 (Biuret Modified Product of Hexamethylene Diisocyanate, Average Number of Isocyanate Groups of 2.8) | — | — | — |
|  | N-100 (Biuret Derivative of Hexamethylene Diisocyanate) | — | 30.00 | — |
| Long-Chain Active Hydrogen Compound | KALCOL 8098 (Stearyl Alcohol) | 89.48 | — | — |
|  | Oleyl Alcohol | — | — | — |
|  | RHEODOL SP-S30 (Sorbitan Tristearate) | — | 116.00 | — |
| Active Hydrogen Compound Having Carbon Atoms of 11 or less | 1-Decanol | — | — | — |
|  | 2-Ethylhexanol | — | — | — |
| Cationic Active Hydrogen Compound | N-Methyldiethanolamine | — | — | 13.94 |
| Anionic Active Hydrogen Compound | 2,2-Dimethylol Propionic Acid(DMPA) | 11.06 | — | — |
| Blocking Agent | 3,5-Dimethylpyrazol | — | — | 44.97 |
| Acid Compound | Acetic Acid | — | 3.40 | 7.02 |
|  | Hydrochloric Acid (35% Aqueous Solution) | — | — | — |
|  | Lactic Acid | — | — | — |
| Neutralizing Agent | Triethylamine | 25.03 | — | — |
| Solvent | Methyl Ethyl Ketone (First Time) | 85.71 | — | 85.71 |
|  | Methyl Ethyl Ketone (Second Time) | 98.90 | — | — |
|  | MIBK | — | 150.00 | — |
| Emulsifier | DM-18D | — | 5.60 | — |
|  | TMN-10 | — | 2.80 | — |
| Ion-Exchanged Water |  | 800.00 | 300.00 | 800.00 |
| Isocyanate Group Concentration (Solid Content) |  | 3.67 | — | 12.68 |
| Average Number of Isocyanate Groups of Aliphatic Polyisocyanate Derivative |  | 3.0 | — | 3.0 |
| Hydrocarbon Group Concentration |  | 42 | 56 | 0 |

TABLE 2

| Ex.-Comparative Ex.-Reference Ex. No. | | | | Ex. 1 | Ex. 2 | Ex. 3 | Ex. 4 Ex. 4/Reference Ex. 1 = 7/3 Mixture | Ex. 5 | Ex. 6 |
|---|---|---|---|---|---|---|---|---|---|
| Evaluation | Treatment Cloth (170° C., 2 min) | Water Repellency Before Washing (Number of Water Drops) | After 15 min | 10 | 10 | 10 | 10 | 10 | 10 |
| | | | After 30 min | 10 | 10 | 10 | 10 | 10 | 10 |
| | | Water Repellency After Washing (Number of Water Drops) | After Washing Five Times After 15 min | — | — | — | — | — | — |
| | | | After Washing Five Times After 90 min | — | — | — | — | — | — |
| | | | After Washing 10 Times After 15 min | 10 | 10 | 5 | 7 | 10 | 10 |
| | | | After Washing 10 Times After 30 min | 10 | 10 | 5 | 7 | 10 | 10 |
| | Treatment Cloth (170° C., 10 min) | Water Repellency Before Washing (Number of Water Drops) | After 15 min | 10 | 10 | 10 | 10 | 10 | 10 |
| | | | After 30 min | 10 | 10 | 10 | 10 | 10 | 10 |
| | | Water Repellency After Washing (Number of Water Drops) | After Washing Five Times After 15 min | — | — | — | — | — | — |
| | | | After Washing Five Times After 90 min | — | — | — | — | — | — |
| | | | After Washing 10 Times After 15 min | 10 | 10 | 5 | 7 | 10 | 10 |
| | | | After Washing 10 Times After 30 min | 10 | 10 | 5 | 7 | 10 | 10 |
| | Water Repellency Washing Durability | | | Excellent Excellent | Excellent Excellent | Excellent Good | Excellent Good | Excellent Excellent | Excellent Excellent |

| Ex.-Comparative Ex.-Reference Ex. No. | | | | Ex. 7 | Ex. 8 | Ex. 9 | Ex. 10 | Ex. 11 |
|---|---|---|---|---|---|---|---|---|
| Evaluation | Treatment Cloth (170° C., 2 min) | Water Repellency Before Washing (Number of Water Drops) | After 15 min | 10 | 10 | 10 | 10 | 10 |
| | | | After 30 min | 10 | 10 | 10 | 10 | 7 |
| | | Water Repellency After Washing (Number of Water Drops) | After Washing Five Times After 15 min | — | — | — | — | — |
| | | | After Washing Five Times After 90 min | — | — | — | — | — |
| | | | After Washing 10 Times After 15 min | 10 | 10 | 10 | 10 | 0 |
| | | | After Washing 10 Times After 30 min | 10 | 10 | 10 | 10 | 0 |
| | Treatment Cloth (170° C., 10 min) | Water Repellency Before Washing (Number of Water Drops) | After 15 min | 10 | 10 | 10 | 10 | 10 |
| | | | After 30 min | 10 | 10 | 10 | 10 | 10 |
| | | Water Repellency After Washing (Number of Water Drops) | After Washing Five Times After 15 min | — | — | — | — | — |
| | | | After Washing Five Times After 90 min | — | — | — | — | — |
| | | | After Washing 10 Times After 15 min | 10 | 10 | 10 | 10 | 2 |
| | | | After Washing 10 Times After 30 min | 10 | 10 | 10 | 10 | 2 |
| | Water Repellency Washing Durability | | | Excellent Excellent | Excellent Excellent | Excellent Excellent | Excellent Excellent | Good Good |

| Ex.-Comparative Ex.-Reference Ex. No. | | | | Comparative Ex. 1 | Comparative Ex. 2 | Comparative Ex. 3 | Reference Ex. 1 |
|---|---|---|---|---|---|---|---|
| Evaluation | Treatment Cloth (170° C., 2 min) | Water Repellency Before Washing (Number of Water Drops) | After 15 min | 8 | 10 | 10 | 0 |
| | | | After 30 min | 7 | 9 | 10 | 0 |
| | | Water Repellency After Washing (Number of Water Drops) | After Washing Five Times After 15 min | — | 2 | 10 | — |
| | | | After Washing Five Times After 90 min | — | 0 | 0 | — |
| | | | After Washing 10 Times After 15 min | 0 | 0 | 0 | 0 |
| | | | After Washing 10 Times After 30 min | 0 | 0 | 0 | 0 |
| | Treatment Cloth (170° C., 10 min) | Water Repellency Before Washing (Number of Water Drops) | After 15 min | 8 | 10 | 10 | 0 |
| | | | After 30 min | 8 | 10 | 10 | 0 |
| | | Water Repellency After Washing (Number of Water Drops) | After Washing Five Times After 15 min | — | 3 | 10 | — |
| | | | After Washing Five Times After 90 min | — | 0 | 4 | — |
| | | | After Washing 10 Times After 15 min | 0 | 0 | 1 | 0 |
| | | | After Washing 10 Times After 30 min | 0 | 0 | 0 | 0 |
| | Water Repellency Washing Durability | | | Good Bad | Good Bad | Excellent Bad | Bad Bad |

4. Consideration

Examples 1 to 11 in which the concentration of the hydrocarbon group is 30% or more and 85% or less have more excellent water repellency and washing durability than Comparative Example 1 in which the concentration of the hydrocarbon group is below 30%.

Thus, it was found that when the concentration of the hydrocarbon group was 30% or more and 85% or less, the water repellency and the washing durability could be improved.

In addition, Examples 1 to 11 using the cationic active hydrogen compound have more excellent water repellency and washing durability than Comparative Example 2 using the anionic active hydrogen compound.

Thus, it was found that when the cationic active hydrogen compound was used, the water repellency and the washing durability could be improved.

Further, Example 5 obtained by internal emulsification has more excellent washing durability than Comparative Example 3 obtained by external emulsification.

Thus, it was found that when the reaction product was prepared by internal emulsification, the washing durability could be improved.

Further, internally emulsified Example 5 has more excellent washing durability than externally emulsified Comparative Example 3.

Even when the water repellency before washing is the same, in internally emulsified Example 5, since the cationic group having affinity for the fibers is introduced into the resin, it can interact with the fibers and the water repellency is retained without falling off even after washing. However, in externally emulsified Comparative Example 3, it is presumed that the cationic group having affinity for the fibers is not introduced into the resin, the resin easily falls off by washing, and therefore, the water repellency after washing is lowered.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The polyurethane resin composition, the repellent, the water repellent for fibers, and the stain-proof coating agent of the present invention can be used for various industrial products, and can be, for example, preferably used for applications of surface treatment agents.

The invention claimed is:

1. A polyurethane resin composition comprising:
   a reaction product of
   an aliphatic polyisocyanate derivative having an average number of isocyanate groups of 2 or more;
   a long-chain active hydrogen compound including a hydrocarbon group having 12 or more and 30 or less carbon atoms and an active hydrogen group in combination;
   a cationic active hydrogen compound including an active hydrogen group and a cationic group in combination; and
   an acid compound capable of a salt with the cationic group, wherein
   the concentration of the hydrocarbon group is 30% or more and 85% or less.

2. The polyurethane resin composition according to claim 1, wherein
   the aliphatic polyisocyanate derivative includes an isocyanurate derivative of an aliphatic polyisocyanate.

3. The polyurethane resin composition according to claim 1, wherein
   in the cationic active hydrogen compound,
   the cationic group is a tertiary amino group,
   the active hydrogen group is a hydroxyl group, and
   the cationic active hydrogen compound has two or more hydroxyl groups per molecule.

4. The polyurethane resin composition according to claim 1, wherein
   the acid compound includes an organic acid.

5. A repellent comprising the polyurethane resin composition according to claim 1.

6. A water repellent for fibers comprising the polyurethane resin composition according to claim 1.

7. A stain-proof coating agent comprising the polyurethane resin composition according to claim 1.

* * * * *